United States Patent [19]

Ota et al.

[11] Patent Number: 5,657,544
[45] Date of Patent: Aug. 19, 1997

[54] DEVICE FOR DETECTING THE ANGLE OF ROTATION

[75] Inventors: Michio Ota, Arlington Heights, Ill.; Kizashi Maruyama, Kuwana, Japan; Masami Kitsunai; Taku Murakami, both of Hiratsuka, Japan

[73] Assignees: NTN Corporation, Osaka; Komatsu LTD., Tokyo, both of Japan

[21] Appl. No.: 533,855

[22] Filed: Sep. 26, 1995

[51] Int. Cl.[6] ................................................ G01B 7/30
[52] U.S. Cl. ...................................... 33/1 N; 33/1 PT
[58] Field of Search ................ 33/1 L, 1 N, 1 PT, 33/706, 707, 534; 338/31, 32 K, 32 H

[56] References Cited

U.S. PATENT DOCUMENTS

| | | | |
|---|---|---|---|
| 4,369,578 | 1/1983 | Ernst | 33/1 PT |
| 4,625,411 | 12/1986 | Kashiwagi et al. | 33/1 N |
| 5,218,769 | 6/1993 | Tranchon | 33/1 N |

FOREIGN PATENT DOCUMENTS 466-228  1/1992  European Pat. Off. ........... 33/1 PT
911-131  3/1982  U.S.S.R. ............................. 33/1 PT

*Primary Examiner*—G. Bradley Bennett
*Attorney, Agent, or Firm*—Birch, Stewart, Kolasch & Birch, LLP

[57] ABSTRACT

A rotational angle detecting device includes a rotary shaft 1 having an annular projection 1c formed therein so as to extend radially outwardly therefrom, and a housing 2 rotatably supporting the rotary shaft 1. A plurality of rolling contact bearings 6 each having inner and outer races are mounted on the rotary shaft 1 under a pre-loaded condition so as to sandwich the annular projection 1 c between the respective inner races of the rolling contact bearings 6. The assembly is rotatably received inside the housing 2 to permit the rotary shaft 1 to be rotatable about a longitudinal axis thereof. A resistor element 12 is disposed on an inner surface of a housing lid 3 in concentric relation to the longitudinal axis of the rotary shaft 1. An electroconductive brush 5 is secured to an end face of the rotary shaft 1 for rotation together with the rotary shaft 1 and held in sliding contact with the resistor element 12.

6 Claims, 4 Drawing Sheets

5,657,544

DEVICE FOR DETECTING THE ANGLE OF ROTATION

BACKGROUND OF THE INVENTION

1. Field of the Invention

The present invention relates generally to a device for detecting the angle of rotation and, more particularly, to the rotational angle detecting device for use in construction machinery and industrial machinery and capable of detecting the angle of rotation of a rotating element such as, for example, a rotary shaft or an oscillating shaft, while the latter is operated under a loaded condition.

2. Description of the Prior Art

As an instrument for measuring the angle of rotation of a rotary shaft or an oscillating shaft, a rotational angle detecting device has long been used. The rotational angle detecting device is a useful instrument as a means for measuring the absolute angle with respect to a reference point. The traditional rotational angle detecting device now in general use is of a structure shown in FIG. 7 and is in the form of a potentiometer including a resistor element 53 and an electroconductive brush 52 movable together with a rotary shaft 51 and held in sliding contact with the resistor element 53. This known rotational angle detecting device is so designed and so configured as to provide a signal of a voltage represented by the resistance of the resistor element 53 which varies depending on the position of the electroconductive brush 52.

In this known rotational angle detecting device, an oil retaining metal or a relatively small rolling contact bearing is employed to permit the rotary shaft 51 to be rotatably supported by a housing 54 and is unable to support a relatively high load such as brought about by the rotary shaft 51. When a relatively high load is imposed on the rotary shaft 51 in an axial or radial direction thereof, a relatively large error occurs in the detected angle of rotation and/or one or both of the resistor element 53 and the electroconductive brush 52 may be damaged. For this reason, where a rotatable mass element coupled with the rotary shaft 51 is relatively heavy and/or a load acts on the rotary shaft 51 of the potentiometer, means must be taken to avoid the load acting directly on the rotary shaft 51 and, for this purpose, a spring element or the like is generally employed to support the rotary shaft 51 during detection of the angle of rotation of the rotary shaft 51.

SUMMARY OF THE INVENTION

The present invention is therefore intended to provide an improved rotational angle detecting device capable of accurately detecting the angle of rotation of a rotary element without suffering from damage even though a relatively high load acts on the rotary element to a certain extent.

In order to accomplish the foregoing object of the present invention, there is, in accordance with one aspect of the present invention, provided a rotational angle detecting device which comprises a rotary shaft having an annular projection formed therein so as to extend radially outwardly therefrom, and a housing rotatably supporting the rotary shaft. A plurality of rolling contact bearings each having inner and outer races are mounted on the rotary shaft with the annular projection of the rotary shaft sandwiched between the respective inner races of the neighboring rolling contact bearings in a pre-loaded condition. The assembly including the plurality of the rolling contact bearings on said rotary shaft is rotatably received inside the housing to permit the rotary shaft to be rotatable about the longitudinal axis thereof. The rotational angle detecting device also comprises a rotational angle detecting means interposed between one end face of the rotary shaft inside the housing and a portion of a wall of the housing confronting the end face of the rotary shaft for detecting an angle of rotation of the rotary shaft relative to the housing.

With the rotational angle detecting device of the present invention so constructed as hereinabove described, the plural bearings under the pre-loaded condition support the rotary shaft relative to the housing and, therefore, even if a relatively high load acts on the rotary shaft in a direction radially or axially thereof, the bearings effectively support such a high load without giving rise to damages to the rotational angle detecting means. Also, since the bearings are pre-loaded, the rotary shaft is less susceptible to a rattling motion, permitting the rotational angle detecting device to accomplish a highly accurate detection of the angle of rotation.

According to another aspect of the present invention, the rotational angle detecting means employed in the rotational angle detecting device comprises first and second sensors. The first sensor includes an electroconductive brush secured to the rotary shaft inside the housing, and a resistor element slidingly engageable with the electroconductive brush and disposed on a portion of a wall of the housing confronting an end face of the rotary shaft. On the other hand, the second sensor includes a magnetic pattern, formed on the end portion of the rotary shaft in concentric relation with the longitudinal axis of the rotary shaft, and a detective element cooperative with the magnetic pattern and secured to the housing in alignment with the magnetic pattern.

According to such another aspect of the present invention, the preloaded bearings effectively support such high load without giving rise to damages to the rotational angle detecting means and, also, the rotary shaft is less susceptible to a rattling motion, permitting the rotational angle detecting device to accomplish a highly accurate detection of the angle of rotation. In addition, should the contact type first sensor be worn out, the non-contact type second sensor is available to detect the rotational angle of the rotary shaft. It is to be noted that "the end portion of the rotary shaft" includes the end face thereof and a peripheral face in the vicinity of the end face.

According to a further aspect of the present invention, the rotational angle detecting member employed in the rotational angle detecting device comprises a magnetic pattern formed on an outer peripheral face of the angular projection, and a detective element cooperative with the magnetic pattern and disposed at a portion of a wall of the housing confronting the magnetic pattern. The detective element is cooperable with the magnetic pattern to detect ah angle of rotation of the rotary shaft.

According to such further aspect of the present invention, in addition to the accomplishment of a highly accurate detection of the angle of rotation due to the employment of the pre-loaded beatings, since the angle of rotation of the rotary shaft is detected by the magnetic pattern on the annular projection of the rotary shaft in cooperation with the detective element provided on the housing, the overall height of the rotational angle detecting device as measured in a direction parallel to the rotary shaft can advantageously be reduced as compared with the rotational angle detecting device employing the rotational angle detecting means disposed between the end face of the rotary shaft and that portion of the wall of the housing.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
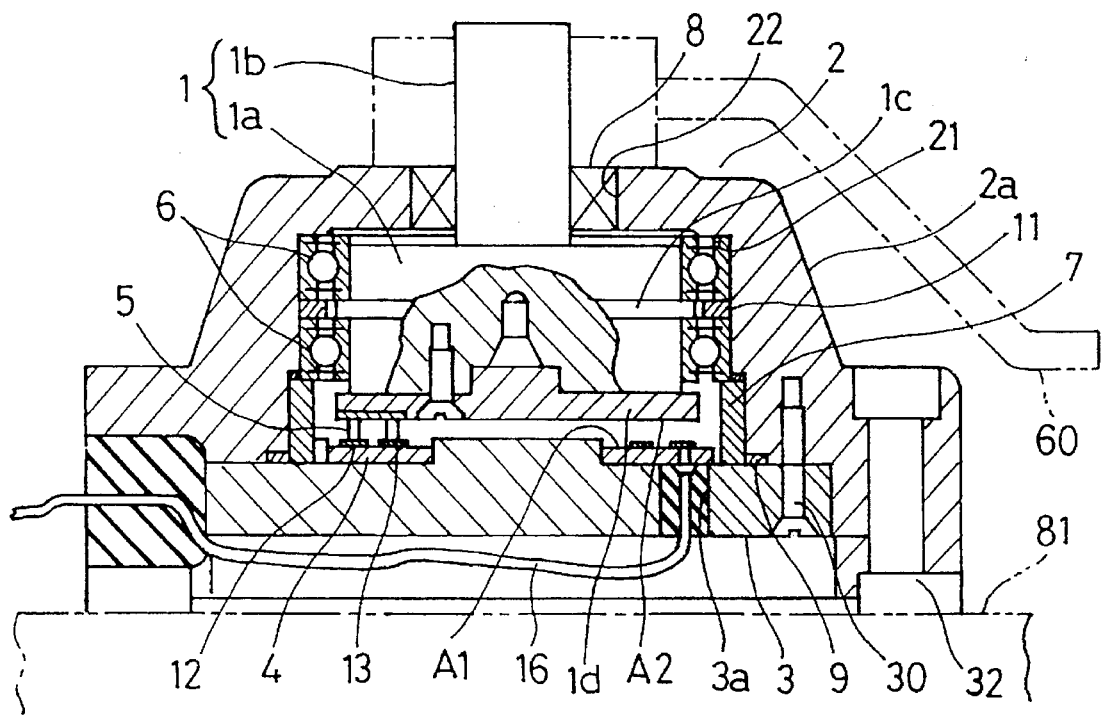
FIG. 1 is a longitudinal sectional view of a rotational angle detecting device according to a first preferred embodiment of the present invention.

Referring first to FIGS. 1 to 4B, a rotational angle detecting device according to a first preferred embodiment of the present invention will be described. As shown therein, the rotational angle detecting device comprises a rotary shaft 1 and a housing 2 for rotatably supporting the rotary shaft 1. The housing 2 includes a generally cap-like casing 2a having a recess opening downwardly and an end lid 3 secured by means of a plurality of set bolts 30 to the cap-like casing 2a from below so as to close the opening of the cap-like casing 2a, thereby leaving a cavity in the housing 2. The cap-like casing 2a may be made of aluminum or cast iron while the end lid 3 may be in the form of an iron plate. To avoid any possible foreign matter into the cavity in the housing 2, the end lid 3 is secured to the bottom of the cap-like casing 2a with a sealing member 9 intervening therebetween. The sealing member 9 may be in the form of, for example, an O-ring. The cap-like casing 2a has a seal hole 22 defined at a top thereof in communication with the cavity of the housing 2, the function of which will be described later.

The rotary shaft 1 includes a shank 1b and a cylindrical block 1a formed at one end of the shank 1b and having a diameter greater than that of the shank 1b. The cylindrical block 1a is rotatably supported by means of upper and lower radial type rolling contact bearings 6 spaced from each other along a longitudinal axis of the rotary shaft 1 within the cavity of the housing 2 in a manner which will be described subsequently. The cylindrical block 1a has a generally intermediate portion formed with a radially outwardly protruding annular projection 1c.

Preferably, each of the upper and lower rolling contact bearings 6 is in the form of a sealed deep-groove ball bearing. Securement of the bearings 6 in position within the cavity of the housing 2 and around the cylindrical block 1a is carried out by the following manner.

The upper and lower bearings 6 are first disposed around the cylindrical block 1a on respective sides of the intermediate annular projection 1c with the respective inner races thereof mounted on the cylindrical block 1a under interference fit so as to sandwich the intermediate annular projection 1c. Prior to either one of the upper and lower bearings 6 being mounted on the cylindrical block 1a, a substantially thin-walled, intermediate outer washer 11 is mounted on the cylindrical block 1a so as to assume such a position that, when such one of the upper and lower bearings 6 is subsequently mounted on the cylindrical block 1a, the intermediate outer washer 11 can be sandwiched between the respective outer races of the upper and lower bearings 6 at a location radially outwardly of the intermediate annular projection 1c.

The assembly including the cylindrical block 1a having the upper and lower bearings 6 mounted thereon is inserted into the cylindrical recess in the cap-like casing 2a until an annular end of the outer race of the upper bearing 6 is brought into abutment with a shoulder 21 defined in the cap-like casing 2a so as to confront the cavity of the housing 2. At this time, the shank 1b protrudes rotatably through the seal hole 22 defined at the top of the cap-like casing 2a. To avoid any possible ingress of foreign matter such as, for example, dust afloat in the environment in which the rotational angle detecting device is used, the seal hole 22 has an oil-impregnated seal 8 filling up an annular gap between the shank 1b and the wall defining the seal hole 22. After the insertion of the assembly referred to above into the cylindrical recess in the cap-like casing 2a in the manner described above, a thick-walled sleeve-like spacer 7 is inserted into the cylindrical recess in the cap-like casing 2a, followed by securement of the end lid 3 to the bottom of the cap-like casing 2a by means of the set bolts 30 to thereby tightly close the cavity of the housing 2.

The intermediate annular projection 1c integral with the cylindrical block 1a has a thickness, as measured in a direction parallel to the longitudinal axis of the rotary shaft 1, which is chosen to be greater than that of the intermediate outer washer 11 positioned within the cavity of the housing 2 and radially outwardly of the annular projection 1c, whereby when the end lid 3 is bolted to the cap-like casing 2a with a force consequently exerted on the sleeve-like spacer 7, the respective inner races of the upper and lower bearings 6 can be urged upwardly and downwardly through the intermediate annular projection 1c, respectively, to place the upper and lower bearings 6 as a whole under a preloaded condition.

As will become clear from the subsequent description, a surface of an annular substrate 4 rigidly mounted on the end lid 3, which faces the cylindrical block 1a of the rotary shaft 1, serves as a stationary sensor surface A1 while a surface of a carrier plate 1d bolted to a free end face of the cylindrical block 1a, which faces the stationary sensor surface A1, serves as a movable sensor surface A2. One or both of the stationary and movable sensor surfaces A1 and A2 may be suitably configured according to the type of a sensor to be employed, i.e., an incremental angle sensor capable of detecting increments of the angle of rotation or whether the rotational angle detecting device of the present invention is used as an absolute angle sensor capable of detecting the absolute angle of rotation in the rotational angle detecting device.

Figure 2A:
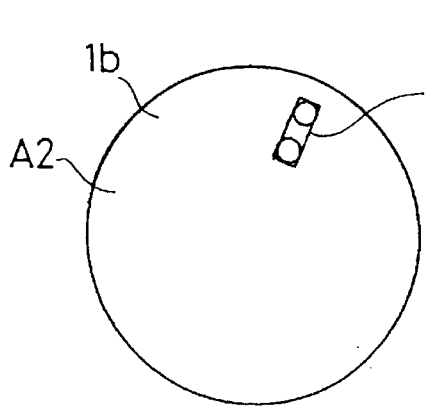
FIG. 2A is a bottom plan view of a movable sensor surface defined in a carrier plate movable together with a rotary shaft forming a part of the rotational angle detecting device.
Figure 3A:
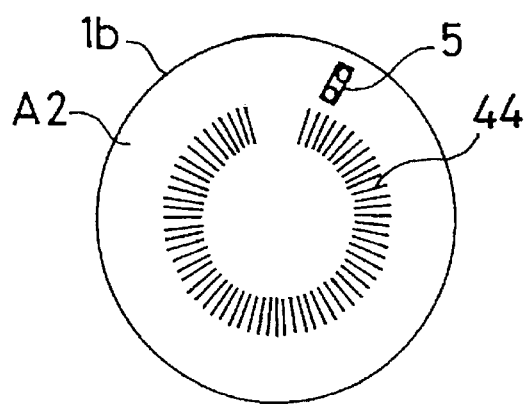
FIG. 3A is a bottom plan view of a modified movable sensor surface defined in the carrier plate movable together with the rotary shaft.
Figure 3B:
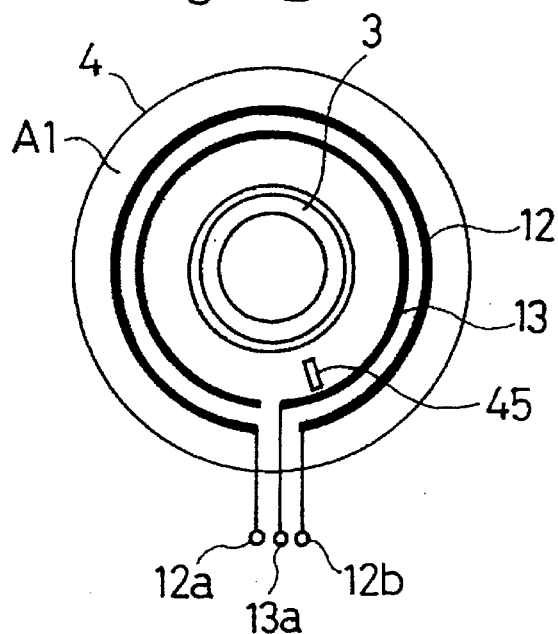
FIG. 3B is a top plan view of a modified stationary sensor surface defined in the substrate rigid with the housing.
Figure 4A:
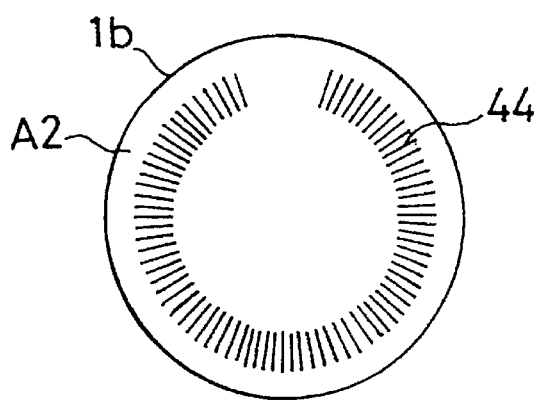
FIG. 4A is a bottom plan view of a further modified movable sensor surface defined in the carrier plate movable together with the rotary shaft.
Figure 4B:
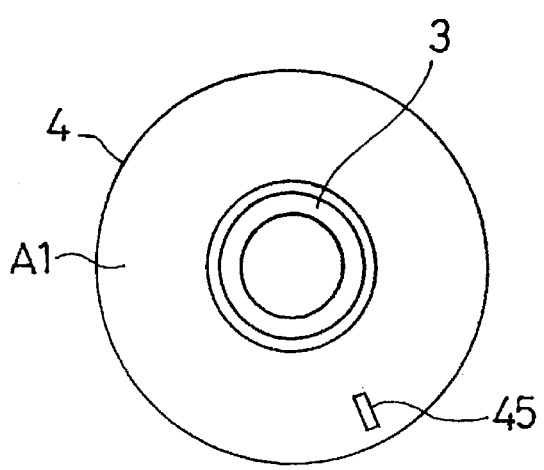
FIG. 4B is a top plan view of a further modified stationary sensor surface defined in the substrate rigid with the housing.

In any event, in designing the angle sensor to be used in the detecting device of the present invention, it is important to pay consideration to the position of the longitudinal axis of the rotary shaft 1, that is, the axis of rotation of the rotary shaft 1. FIGS. 2A to 4B illustrate different sensors which can be used in the rotational angle detecting device of the present invention. It is to be noted that FIGS. 2A, 3A and 4A illustrate bottom plan views of the different movable sensor surfaces A2, respectively, and FIGS. 2B, 3B and 4B illustrate top plan views of the different stationary sensor surfaces A1 that are utilized in combination with the movable sensor surfaces A2 shown in FIGS. 2A, 3A and 4A, respectively.

A contact type first sensor which is in the form of a potentiometer will now be described with particular reference to FIGS. 2A and 2B. The stationary sensor surface A1 of the substrate 4 is provided, or otherwise formed, with a resistor element 12 of a split-ting shape and an electroconductive stripe 13 of a generally split-ring shape positioned inside the resistor element 12 in a substantially concentric relation. An electroconductive brush 5, slidingly engaged to the resistor element 12 and the electroconductive stripe 13 so as to short-circuit between them, is secured to the movable sensor surface A2 of the carrier plate 1d bolted to the cylindrical block 1a. A contact pressure between the electroconductive brush 5 and the resistor element 12 is adjusted by a thickness of the spacer 7 as measured in a direction parallel to the rotary shaft 1.

The resistor element 12 is in the form of, for example, an electroconductive resin deposited on the stationary sensor surface A1 of the substrate 4. The resistor element 12 has opposite ends connected to respective terminals 12a and 12b, and only one of the opposite ends of the electroconductive stripe 13 is connected to a terminal 13a. Lead lines 16, connected with and extending from the respective terminals 12a, 12b and 13a, are bundled and then dram out of the housing 2 through a lead-out hole 3a defined in the end lid 3. As a matter of practice, a grommet is tightly inserted in the lead-out hole 3a to avoid any possible ingress of foreign matter into the cavity in the housing 2.

Figure 2B:
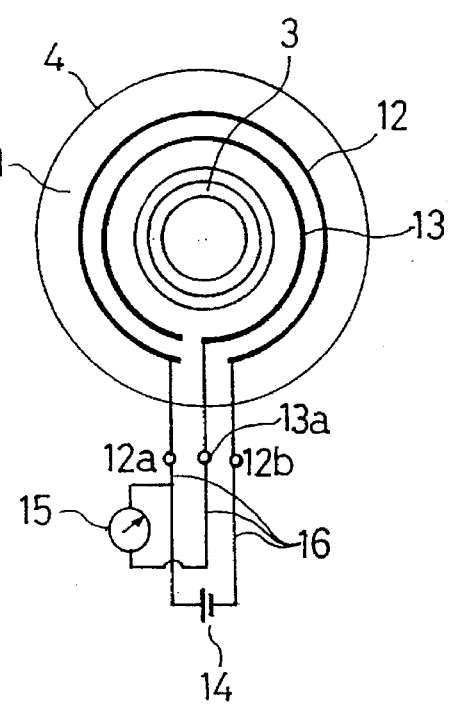
FIG. 2B is a top plan view of a stationary sensor surface defined in a substrate rigid with a housing forming another part of the rotational angle detecting device.

An electric circuit required for the first sensor of the potentiometer type to detect the angle of rotation of the rotary shaft 1 is such as shown in FIG. 2B wherein the terminals 12a and 12b, connected with the opposite ends of the resistor element 12, are connected to plus and negative poles of the direct current power source 14 so that a predetermined D.C. voltage can be supplied to the resistor element 12. A voltmeter 15 is connected between the terminal 12a and the terminal 13a connected with the electroconductive stripe 13. With this electric circuit, it is clear that a voltage supplied to the terminals 12a and 12b of the resistor element 12 and divided by the electroconductive brush 5 can be indicated by the voltmeter 15. Accordingly, the voltage indicated by the voltmeter 15 is an indication of the position of the electroconductive brush 5 and, hence, the angle of rotation of the rotary shaft 1 relative to the housing 2.

FIGS. 3A and 3B illustrate a redundant-type rotational angle sensor in which the first sensor of the structure shown in and described with reference to FIGS. 2A and 2B is employed in combination with a non-contact type second sensor having a generally ring-shaped pattern of dots. The first sensor shown in FIGS. 3A and 3B is substantially similar in structure and function to that shown in FIGS. 2A and 2B and, therefore, the details thereof will not be reiterated for the sake of brevity. Referring to FIGS. 3A and 3B, a magnetic detective element 45 which may be a magnetoresistance element (MR element) or Hall element is formed on the stationary sensor surface A1 on the side of the housing 2 while a generally ring-shaped magnetic pattern 44 is formed on the movable sensor surface A2 on the side of the rotary shaft 1. Although not shown, a lead line for feeding a signal from the Hall element 45 extends through the end lid 3 of the housing 2 to the outside of the housing 2.

When the angle of rotation is desired to be detected, and provided that both of the first and second sensors are functioning properly, the position of the rotary shaft 1 about its own longitudinal axis is approximately detected incrementally on the basis of pulse signals from the Hall element 45 of the second sensor and the exact position of such rotary shaft 1 corresponding to the quantity between the pulse signals is then detected in terms of the resistance of the first sensor (a voltage reading of the voltmeter 15), but in the event of failure of one of the first and second sensors, the output signal from the other of the first and second sensors is used for the actual determination of the angle of rotation. Although the second sensor according to this modification of FIGS. 3A and 3B is an incremental angle sensor capable of detecting increments of the angle of rotation, it can be rendered to be an absolute angle sensor if the magnetic pattern 44 and the detective element 45 are employed in plural number.

The rotational angle detecting device wherein the first sensor referred to above is not employed is shown in FIGS. 4A and 4B, but only the second sensor referred to above is employed. The second sensor shown in FIGS. 4A and 4B is substantially identical in structure and function to that shown in FIGS. 3A and 3B and, therefore, the details thereof will not be reiterated for the sake of brevity. As described in connection with FIGS. 3A and 3B, it may be assembled as an absolute angle sensor if the magnetic pattern 44 and the detecting element 45 are employed as a plurality.

While it is a general practice to provide the stationary and movable sensor surfaces A1 and A2 in the prior art rotational angle detecting device 50 with elements forming the first sensor in the form of a potentiometer, the rotational angle detecting device operable under a highly loaded condition such as that of the present invention may have a disadvantage in that the electroconductive brush 5 may be worn out as a result of sliding contact with the accuracy of detection of the angle lowered consequently. In view of this, the use of the redundant type, particularly the use of the redundant type in combination with the non-contact sensor (the second sensor) such as shown in FIGS. 3A and 3B is effective to avoid the above discussed disadvantage.

In this rotational angle detecting device, the rotary shaft 1 is supported within the housing 2 by the plural bearings 6 which are pre-loaded and, therefore, even when a relatively high load acts on the rotary shaft 1 in respective directions axially and radially of the rotary shaft 2, these bearings 6 can effectively and satisfactorily support such high load to thereby minimize any possible damage to the resistor element 12 and so on. Also, since the bearings 6 are pre-loaded, the rotary shaft 1 does not undergo a rattling motion and, even under the highly loaded condition, the angle of rotation of the rotary shaft 1 can be detected accurately.

By way of example, where a sealed deep-groove ball bearing of 40 mm in inner diameter and 52 mm in outer diameter is used for each of the bearings 6 and even when the load of 100 kgf acts on the rotary shaft 1 in the axial direction thereof, an axial displacement of the rotary shaft 1 has been found 25 μm and the linearity of the rotational angle detecting device itself has been found not higher than ±1%. Thus, the rotational angle detecting device of the present invention is effective to accomplish detection of the angle of rotation with high accuracy.

The resolution of the rotational angle detecting device of the present invention can be increased if the cylindrical block 1a has a portion radially inwardly stepped down to provide large and small diameter end portions with the small diameter end portion thereof supported by a bearing and the movable sensor surface A2 is defined in a free end face of the large diameter end portion to thereby secure a surface area.

The rotational angle detecting device according to a second preferred embodiment of the present invention will now be described with particular reference to FIGS. 5A and 5B.

Figures 5A, 5B:
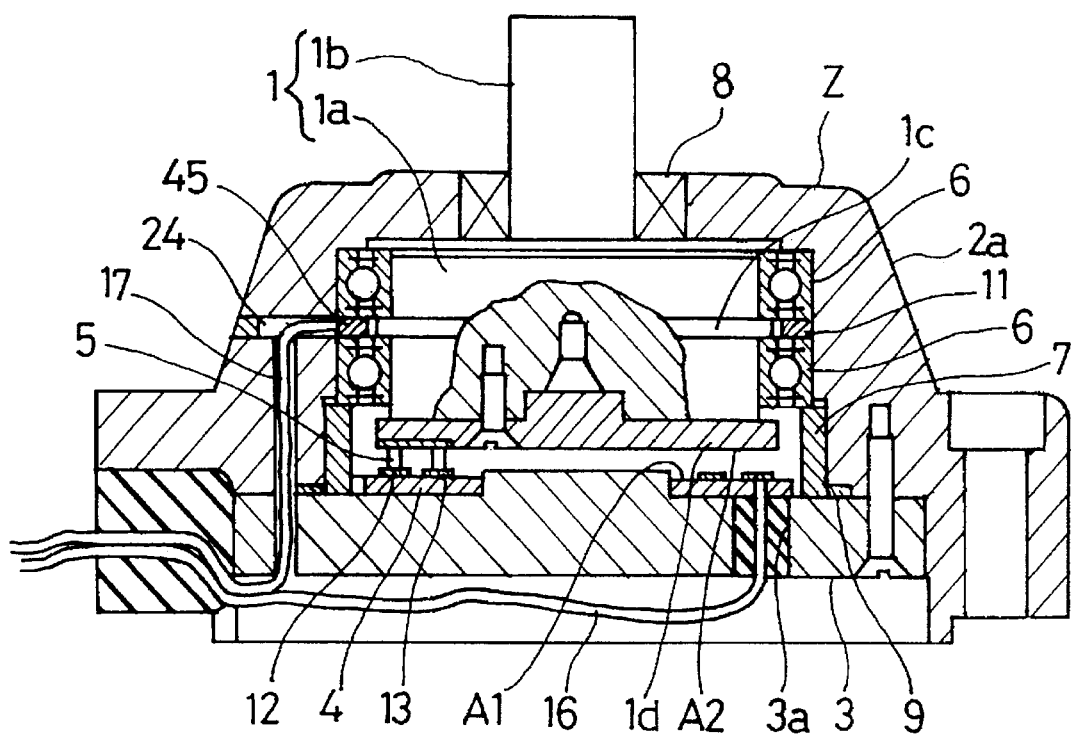
FIG. 5A is a longitudinal sectional view of the rotational angle detecting device according to a second preferred embodiment of the present invention.
FIG. 5B is a perspective view, on an enlarged scale, showing a large diameter portion of the rotary shaft and its associated parts employed in the rotational angle detecting device shown in FIG. 5A.

As shown in FIG. 5A in a sectional representation, the rotational angle detecting device according to the second preferred embodiment of the present invention is similar to that according to the first embodiment of the present invention, but differs therefrom in that in addition to the first sensor of a potentiometer type a second sensor is employed. This second sensor includes a magnetic pattern 44 formed on an outer peripheral surface of the intermediate annular projection 1c of the cylindrical block 1a for rotation together with the rotary shaft 1 and a Hall element 45 disposed at a portion of the cap-like casing 2a of the housing 2 which is in alignment with the magnetic pattern 44. The Hall element 45 is, as shown in FIG. 5B in a perspective view, received in a cutout defined in the intermediate outer washer 11 and, as shown in FIG. 5A, has a lead line 17 extending therefrom to the outside of the housing 2 through a lead-out passage 24 defined in the wall of the cap-like casing 2a and the end lid 3.

Referring particularly to FIG. 5B, when the rotary shaft 1 rotates about its own longitudinal axis accompanied by a corresponding rotation of the magnetic pattern 44, the Hall element 45 detects the intensity of a magnetic field by measuring a voltage and, therefore, change in position of the magnetic pattern 44 relative to the Hall element 45, that is, the angle of rotation of the rotary shaft 1 can be detected accurately.

In the practice of the second preferred embodiment of the present invention, only the second sensor may be utilized to detect the angle of rotation of the rotary shaft 1. In such a case, the electroconductive brush 5, the resistor element 12 and the electroconductive stripe 13 which have been shown and described as positioned between the free end of the cylindrical block 1a of the rotary shaft 1 and the end lid 3 of the housing 2 may be dispensed with, thereby permitting the rotational angle detecting device to be assembled compact, i.e., having a reduced dimension as measured in a direction parallel to the rotary shaft 1.

While the rotational angle detecting device embodying the present invention may find a wide range of application, one example of use of the rotational angle detecting device embodying the present invention will now be described with particular reference to FIG. 6.

Figure 6:
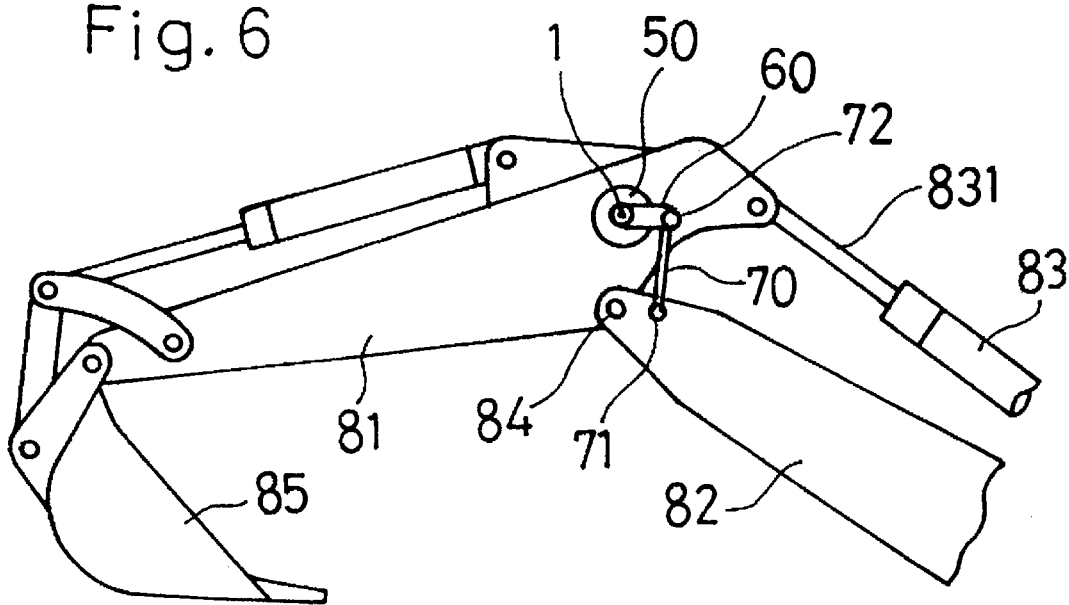
FIG. 6 is a schematic diagram showing an example of use of the rotational angle detecting device of the present invention.
Figure 7:
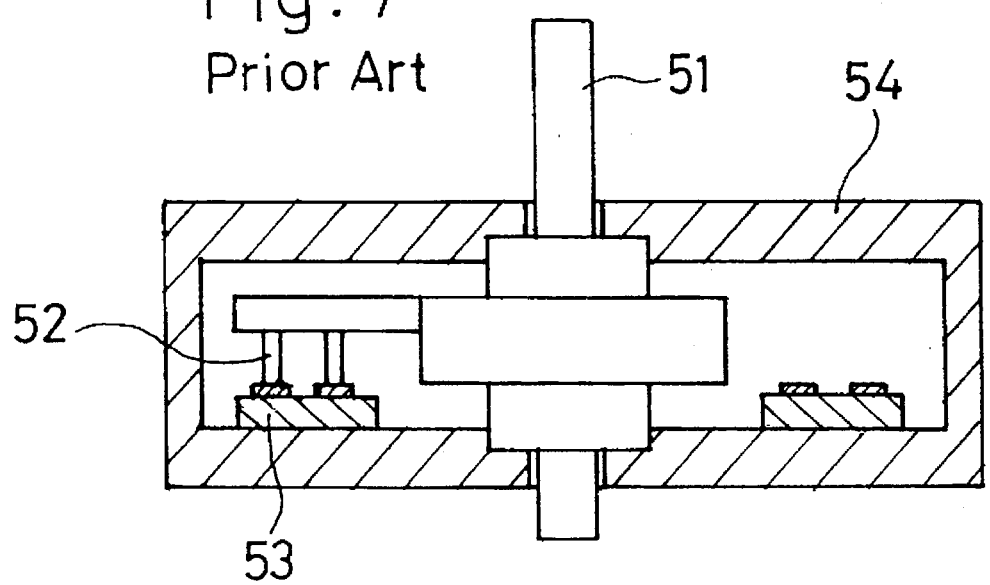
FIG. 7 is a schematic longitudinal sectional view of the prior art rotational angle detecting device.

Referring to FIG. 6, the rotational angle detecting device, now generally identified by 50, according to the first preferred embodiment (FIG. 1) of the present invention is shown as used in association with a hydraulic excavator. It is, however, to be noted that the rotational angle detecting device according to the second preferred embodiment of the present invention shown in and described with reference to FIG. 5 can be employed equally in such application.

As shown in FIG. 6, the hydraulic excavator includes an arm 81 pivotally coupled at one end with a boom 82 through a hinge pin 84 and at the opposite end with a bucket 85. The arm 81 has, as shown in FIG. 1, a pedestal 32 fixedly secured to one side face thereof at a location adjacent the hinge pin 84. The rotational angle detecting device 50 is firmly bolted to the pedestal 32 with the shank 1b lying substantially horizontally so as to extend laterally outwardly with respect to the arm 81.

A free end of the shank 1b of the rotary shaft 1 protruding outwardly from the housing 2 in the manner described hereinbefore has a lever 60 secured thereto for rotation together with the rotary shaft 1. The lever 60 is in turn connected with the boom 82 by means of a connecting rod 70 having one end 71 coupled pivotally with the boom 82 at a location adjacent the hinge pin 84 and the opposite end 72 pivotally connected with a free end of the lever 60.

Between the arm 81 and the boom 82 is interposed a hydraulic cylinder 83 having a piston rod 831 movable between extended and retracted positions so that, when the piston rod 831 is moved, the arm 81 pivots either counter-clockwise or clockwise about the hinge pin 84. This pivotal movement of the arm 81 results in a change in the angle of the arm 81 relative to the boom 82 which is then detected by the rotational angle detecting device 50.

In such an application, a relatively high load acts on the rotary shaft 1 of the rotational angle detecting device 50 in a direction radially and axially of the rotary shaft 1 through the connecting rod 70 and the lever 60. However, since the rotary shaft 1 is firmly supported by the housing 2 through the bearings 6 in the pre-loaded condition as hereinbefore described, the rotary shaft 1 is less susceptible to a raffling motion, making it possible to accomplish a highly accurate detection of the angle of rotation.

It is to be noted that although in describing the example of use of the rotational angle detecting device 50 the latter has been shown and described as used to detect the angle of inclination of the arm 81 relative to the boom 82, similar devices may be used to detect the angle of pivot of the bucket 85 relative to the arm 81, or the angle of inclination of the boom 82 relative to a swivel support for the boom 82. Thus, the use of the rotational angle detecting device or devices in the hydraulically operated excavator proliferates the progress of mechatronics.

Although the present invention has been frilly described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rotational angle detecting device which comprises:

a rotary shaft having an annular projection formed therein so as to extend radially outwardly therefrom;

a housing rotatably supporting the rotary shaft;

a plurality of rolling contact bearings mounted on the rotary shaft and spaced from each other along a longitudinal axis of the rotary shaft, each of said rolling contact bearings having inner and outer races, said annular projection of the rotary shaft being sandwiched between the respective inner races of the neighboring rolling contact bearings in a pre-loaded condition, said plurality of the rolling contact bearings on said rotary shaft being received inside the housing to permit the rotary shaft to be rotatable about the longitudinal axis thereof; and a rotational angle detecting means interposed between one end face of the rotary shaft inside the housing and a portion of a wall of the housing confronting said end face of the rotary shaft for detecting an angle of rotation of the rotary shaft relative to the housing.

2. The rotational angle detecting device as claimed in claim 1, wherein said rotational angle detecting means comprises an electroconductive brush secured to the rotary shaft and a resistor element disposed on said portion of the wall of the housing, said electroconductive brush being slidingly engaged with the resistor element.

3. The rotational angle detecting device as claimed in claim 1, wherein said rotational angle detecting means comprises a magnetic pattern formed on the rotary shaft in concentric relation with the longitudinal axis of the rotary shaft, and a detective element cooperative with the magnetic pattern and secured to said portion of the wall of the housing in alignment with the magnetic pattern.

4. A rotational angle detecting device which comprises:

a rotary shaft having an annular projection formed therein so as to extend radially outwardly therefrom;

a housing rotatably supporting the rotary shaft;

a plurality of rolling contact bearings mounted on the rotary shaft and spaced from each other along a longitudinal axis of the rotary shaft, each of said rolling contact bearings having inner and outer races, said annular projection of the rotary shaft being sandwiched between the respective inner races of the neighboring rolling contact bearings in a pre-loaded condition, said plurality of the rolling contact bearings on said rotary shaft being received inside the housing to permit the rotary shaft to be rotatable about the longitudinal axis thereof; and a rotational angle detecting means for detecting an angle of rotation of the rotary shaft relative to the housing which comprises a first sensor including an electroconductive brush secured to the rotary shaft inside the housing, and a resistor element slidingly engageable with the electroconductive brush and disposed on a portion of a wall of the housing confronting an end face of the rotary shaft, and a second sensor including a magnetic pattern, formed on an end portion of the rotary shaft in concentric relation with the longitudinal axis of the rotary shaft, and a detective element cooperative with the magnetic pattern and secured to the housing in alignment with the magnetic pattern.

5. A rotational angle detecting device which comprises:

a rotary shaft having an annular projection formed therein so as to extend radially outwardly therefrom;

a housing rotatably supporting the rotary shaft;

a plurality of rolling contact bearings mounted on the rotary shaft and spaced from each other along a longitudinal axis of the rotary shaft, each of said rolling contact bearings having inner and outer races, said annular projection of the rotary shaft being sandwiched between the respective inner races of the neighboring rolling contact bearings in a pre-loaded condition, said plurality of the rolling contact bearings on said rotary shaft being received inside the housing to permit the rotary shaft to be rotatable about the longitudinal axis thereof;

a magnetic pattern formed on an outer peripheral face of the annular projection; and a detective element disposed at a portion of a wall of the housing confronting the magnetic pattern, said detective element being cooperable with said magnetic pattern to detect an angle of rotation of the rotary shaft relative to the housing.

6. The rotational angle detecting device as claimed in claim 5, further comprising an electroconductive brush secured to the rotary shaft inside the housing, and a resistor element disposed on a portion of the wall of the housing which confronts an end face of the rotary shaft, said electroconductive brush being slidingly engaged with the resistor element.

* * * * *